(12) United States Patent
St. Clair et al.

(10) Patent No.: US 11,618,560 B2
(45) Date of Patent: Apr. 4, 2023

(54) DOUBLE-BLOWN WING VERTICAL TAKEOFF AND LANDING AIRCRAFT

(71) Applicant: Aurora Flight Sciences Corporation, Manassas, VA (US)

(72) Inventors: Ran D. St. Clair, San Jose, CA (US); Robert W. Parks, San Jose, CA (US); Robert Ormiston, Sunnyvale, CA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 399 days.

(21) Appl. No.: 17/010,557

(22) Filed: Sep. 2, 2020

(65) Prior Publication Data

US 2021/0139141 A1    May 13, 2021

Related U.S. Application Data

(63) Continuation of application No. 15/372,644, filed on Dec. 8, 2016, now abandoned.

(60) Provisional application No. 62/264,973, filed on Dec. 9, 2015.

(51) Int. Cl.
| | |
|---|---|
| *B64C 29/00* | (2006.01) |
| *B64C 9/16* | (2006.01) |
| *B64C 5/02* | (2006.01) |

(52) U.S. Cl.
CPC ............ *B64C 29/0025* (2013.01); *B64C 5/02* (2013.01); *B64C 9/16* (2013.01)

(58) Field of Classification Search
CPC ............ B64C 29/0025; B64C 29/0033; B64C 29/005
See application file for complete search history.

(56) References Cited

U.S. PATENT DOCUMENTS

| | | | |
|---|---|---|---|
| 1,622,676 | A | 3/1927 | Sartini |
| 1,738,458 | A | 12/1929 | Sorce |
| 1,783,458 | A | 12/1930 | Windsor |
| 1,787,325 | A | 12/1930 | Rubin |

(Continued)

OTHER PUBLICATIONS

Gimme some W.U.V (Winged Utility Vehicle) Build Thread—RC Groups, downloaded from http://www.rcgroups.com/forums/showthread.php?5=2307837&page=12 on Dec. 4, 2015.

(Continued)

*Primary Examiner* — Tien Q Dinh
*Assistant Examiner* — William L Gmoser
(74) *Attorney, Agent, or Firm* — Hanley, Flight & Zimmerman

(57) ABSTRACT

Example double-blown wing vertical takeoff and landing aircraft are disclosed. An example apparatus includes a wing having a leading edge and a trailing edge, a mounting rib having a first end and a second end, the mounting rib coupled to the wing, the first end forward of the leading edge, the second end aft of the trailing edge, the mounting rib including: a first rotor having a first propeller, the first rotor coupled to the first end of the mounting rib below the leading edge, the first propeller having a first axis of rotation, and a second rotor having a second propeller, the second rotor coupled to the second end of the mounting rib above the trailing edge, the second propeller having a second axis of rotation substantially perpendicular to the first axis of rotation.

25 Claims, 12 Drawing Sheets

(56) References Cited

U.S. PATENT DOCUMENTS

| | | |
|---|---|---|
| 1,988,919 A | 1/1935 | Santarsiero |
| 2,048,950 A | 7/1936 | Roepke |
| 2,445,446 A * | 7/1948 | Mas ................. B64D 27/00 440/86 |
| 2,959,373 A | 11/1960 | Zuck |
| 3,149,800 A | 9/1964 | Sintes et al. |
| 3,185,408 A * | 5/1965 | Higgins ............ B64C 29/0033 244/7 R |
| 3,572,612 A | 3/1971 | Irbitis |
| 3,586,262 A | 6/1971 | Sherman |
| 3,592,412 A | 7/1971 | Glatfelter |
| 3,900,176 A | 8/1975 | Everett |
| 3,987,983 A | 10/1976 | Cole |
| 4,125,232 A | 11/1978 | MacLean et al. |
| 4,447,028 A | 5/1984 | Wang |
| 4,531,692 A | 7/1985 | Mateus |
| 5,085,315 A | 2/1992 | Sambell |
| D113,880 S | 3/1999 | Rogers |
| 6,328,265 B1 | 12/2001 | Dizdarevic |
| 6,340,133 B1 | 1/2002 | Capanna |
| 9,120,560 B1 | 9/2015 | Armer et al. |
| 10,124,890 B2 | 11/2018 | Sada-Salinas et al. |
| 2013/0020429 A1 | 1/2013 | Kroo |
| 2015/0136897 A1 | 5/2015 | Seibel et al. |
| 2021/0197965 A1* | 7/2021 | Kunz ................. B64C 29/0025 |
| 2022/0041280 A1* | 2/2022 | Tian ....................... B64C 37/02 |

OTHER PUBLICATIONS

Wcolby1, "Winged Utility Vehicle or WUV built by Ran D. St. Clair," May 3, 2015, http://www.youtube.com/watch?v=DL2HrNPqOLI (Year: 2015).

United States Patent and Trademark Office, "Non-Final Office Action", issued in connection with U.S. Appl. No. 15/372,644, filed Dec. 6, 2018, (13 pages).

United States Patent and Trademark Office, "Final Office Action", issued in connection with U.S. Appl. No. 15/372,644, filed Apr. 22, 2019, (18 pages).

United States Patent and Trademark Office, "Non-Final Office Action", issued in connection with U.S. Appl. No. 15/372,644, filed Feb. 12, 2020, (21 pages).

United States Patent and Trademark Office, "Final Office Action", issued in connection with U.S. Appl. No. 15/372,644, filed Jun. 2, 2020, (21 pages).

* cited by examiner

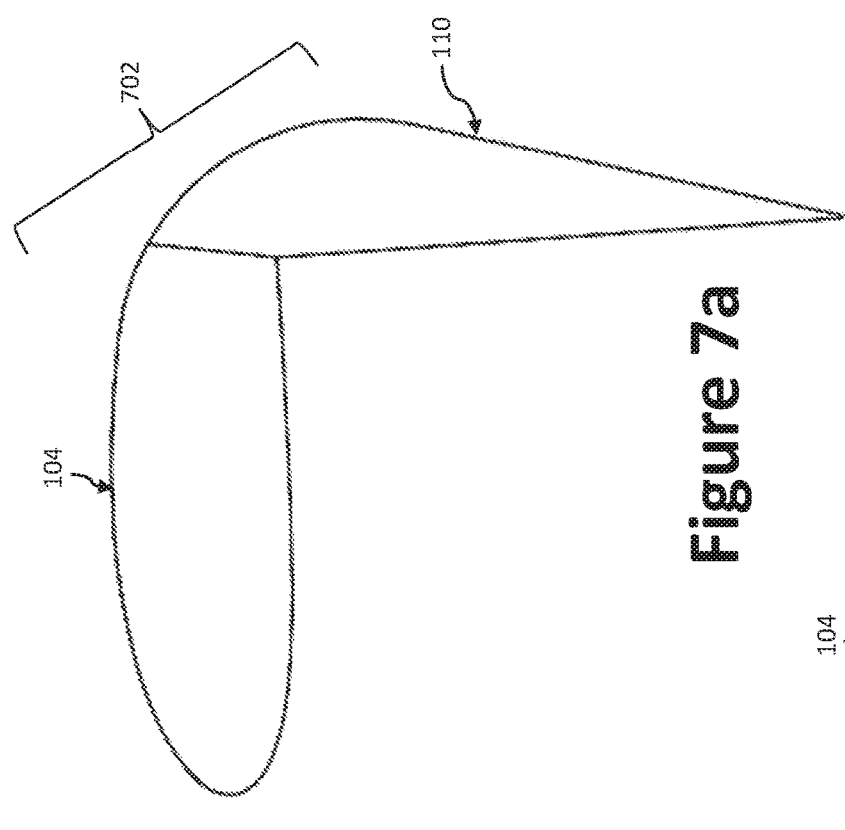
Figure 7a
Figure 7b

DOUBLE-BLOWN WING VERTICAL TAKEOFF AND LANDING AIRCRAFT

CROSS-REFERENCE TO RELATED APPLICATION

This patent arises from a continuation of U.S. patent application Ser. No. 15/372,644, which was filed on Dec. 8, 2016, which claims the benefit under 35 U.S.C. § 119(e) of U.S. Provisional Patent Application No. 62/264,973, which was filed on Dec. 9, 2015 and titled "Double-Blown Wing Vertical Takeoff And Landing Aircraft." U.S. patent application Ser. No. 15/372,644 and U.S. Provisional Patent Application No. 62/264,973 are hereby incorporated herein by reference in their entireties. Priority to U.S. patent application Ser. No. 15/372,644 and U.S. Provisional Patent Application No. 62/264,973 is hereby claimed.

TECHNICAL FIELD

The present invention relates to the field of vertical/short takeoff and landing aircraft; more particularly, to a vertical/short takeoff and landing aircraft with improved efficiency, simple transition, and minimal flight restrictions; even more particularly, to a vertical/short takeoff and landing aircraft with a double-blown wing.

BACKGROUND

There has long been a need, exacerbated by today's overseas contingency operations, for short or vertical take-off and landing ("VTOL") vehicles that are capable of being deployed from confined spaces. In fact, many situations favor vehicles, specifically unmanned aerial vehicles ("UAV"), which can launch and recover vertically without requiring complex or heavy ground support equipment. Existing VTOL aircraft offer a number of disadvantages. For example, Harrier and F-35b cannot perform a vertical take-off from an asphalt runway without runway damage. Another VTOL attempt includes tailsitter aircraft, such as the Lockheed XFV-1 and Convair XFY-1 Pogo. Tailsitters, however, are hard to land, provide poor control near ground, are easy to blow over, and require that the pilot look over his or her shoulder to land. Another aircraft configuration include deflected slipstream, which struggle to achieve a 90-degree deflection and yield inefficient turning flow. Example deflected slipstream aircraft include, for example, Robertson VTOL, Ryan 92 VZ-3, and Fairchild 224 VZ-5.

Compound helicopters (e.g., a helicopter with a wing) are limited in terms of top speed due to the helicopter rotor and, to date, have had limited success due to issues of designing the wing and rotor to work together properly over the entire flight envelope. Such compound helicopters include, for example, the Lockheed AH-56 Cheyenne, Piasecki 16H-1, and Kamov Ka-22. Other attempted include tilting duct aircraft, such as Nord 500 Cadet, Bell X-22A, and Doak 16 VZ-4. These tilting duct aircraft, however, suffer from a number of drawbacks including, for example, higher disc loading, faster downwash, and duct stall in transition issues.

Finally, another form of VTOL aircraft include tilt wing and tilt rotor aircraft. Examples include Vertol 76 VZ-2, Hiller X-18, LTV-Hiller-Ryan XC-142, Canadair CL-84, Transcendental 1G, Bell XV-3, Bell XV-15, and Bell Boeing V-22. Tilt rotor aircraft suffer a number of drawbacks. First, the wing is in rotor wash during hover. Second, the wing is downloaded by rotor in transition. Similarly, the tilt wing suffer from wing stall during transition (e.g., between hover and forward flight).

The ability to deploy organically a UAV is particularly attractive in situations such as forward operating bases, clandestine locales, payload emplacement, and on-the move situations. Thus, a need exists for a further improved VTOL aircraft.

SUMMARY OF THE INVENTION

The present invention is directed to a vertical or short takeoff and landing (V/STOL) aerial vehicle with a double-blown wing.

According to a first aspect, a vertical or short takeoff and landing (V/STOL) aerial vehicle comprises: a wing having a leading edge and a trailing edge; a thrust rotor operatively coupled with the wing, wherein the thrust rotor comprises a first propeller having a first fixed axis of rotation that is substantially horizontal, and wherein the first propeller is positioned forward of the leading edge; and a lift rotor operatively coupled with the wing, wherein the lift rotor comprises a second propeller having a second fixed axis of rotation that is substantially perpendicular to said first fixed axis of rotation.

According to a second aspect, a vertical or short takeoff and landing (V/STOL) aerial vehicle comprises: a fuselage; a wing operatively coupled with the fuselage, the wing having a leading edge and a trailing edge; a thrust rotor operatively coupled with the wing, wherein the thrust rotor comprises a first propeller having a first fixed axis of rotation that is substantially horizontal, and wherein the first propeller is positioned forward of the leading edge; and a lift rotor operatively coupled with the wing, wherein the lift rotor comprises a second propeller having a second fixed axis of rotation that is substantially perpendicular to said first fixed axis of rotation.

In certain aspects, the wing comprises a trailing edge flap.

In certain aspects, the thrust rotor is configured to generate a horizontal thrust force.

In certain aspects, the lift rotor is configured to generate a vertical thrust force.

In certain aspects, the trailing edge flap is configured to redirect at least a portion of the horizontal thrust force to generate a vertical force.

In certain aspects, the trailing edge flap is configured to pivot between a horizontal position and a substantially vertical position.

In certain aspects, the trailing edge flap deflects downwardly between 75 degrees and 90 degrees when in the substantially vertical position.

In certain aspects, the trailing edge flap deflects downwardly between 80 degrees and 85 degrees when in the substantially vertical position.

In certain aspects, the trailing edge flap is configured to interact with the flow through the lift rotor and/or the thrust rotor to produce a suction force that increases the vertical force.

In certain aspects, the thrust rotor and the lift rotor are coupled to a common structural component. In certain aspects, the common structural component is a single shared mounting rib or beam.

In certain aspects, the V/STOL aerial vehicle further comprises a second lift rotor that is not coupled with the wing.

In certain aspects, the second lift rotor is configured to generate a vertical thrust force that provides pitching moment control forces and/or is positioned forward of the V/STOL aerial vehicle's center of gravity.

In certain aspects, a normal pitching moment from the lift rotor is trimmed by an upload that adds to the vertical force.

In certain aspects, the lift rotor is only driven while the V/STOL aerial vehicle is in hover mode or traveling at a horizontal airspeed below the wing's stall speed.

In certain aspects, the second propeller is oriented to minimize drag when the V/STOL aerial vehicle is in wing-borne flight mode.

In certain aspects, the wing comprises four lift rotors and four thrust rotors.

In certain aspects, the V/STOL aerial vehicle comprises a horizontal stabilizer surface configured to provide control while the V/STOL aerial vehicle is a horizontal flight mode.

In certain aspects, the horizontal stabilizer surface is aft of the wing, which may be positioned higher than the wing, thereby minimizing a downwash effect of the lift rotor.

In certain aspects, the horizontal stabilizer surface pivots as a single unit and/or may be configured to align with an airflow resulting from a downwash effect.

DESCRIPTION OF THE DRAWINGS

These and other advantages of the present invention will be readily understood with the reference to the following specifications and attached drawings wherein:

FIGS. 7a and 7b illustrate an example wing airfoil that has a smooth upper surface with the deflected flap.

DETAILED DESCRIPTION

Figure 1:
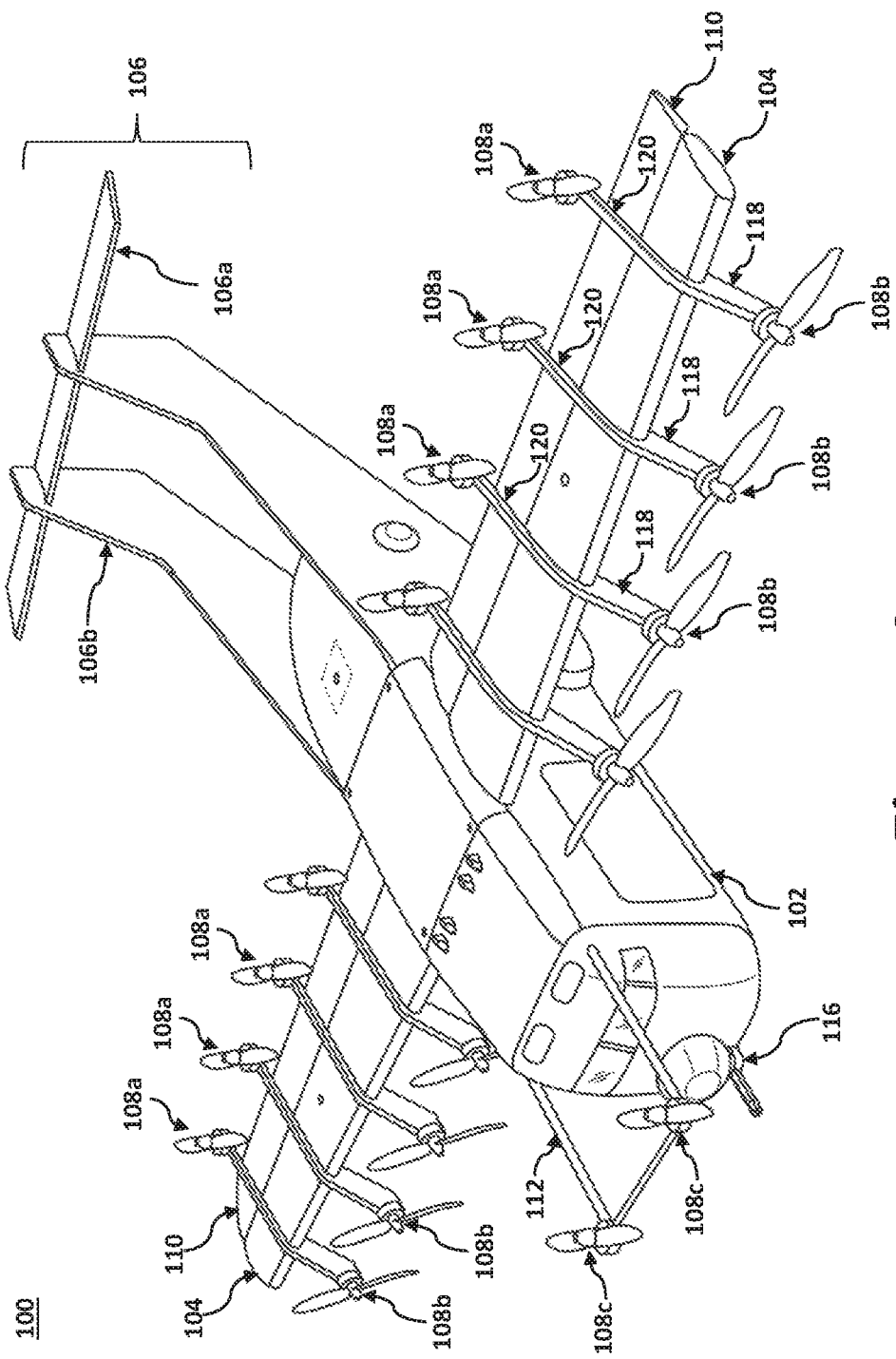
FIG. 1 illustrates a left front isometric view of an example double-blown wing V/STOL.

Preferred embodiments of the present invention will be described hereinbelow with reference to the accompanying drawings. In the following description, well-known functions or constructions are not described in detail because they may obscure the invention in unnecessary detail. For this disclosure, the following terms and definitions shall apply.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory trim, etc.).

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As utilized herein, the term "exemplary" means serving as a non-limiting example, instance, or illustration. As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.).

As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations. The terms horizontal and vertical, as used herein, are used to describe angles or planes relative to the ground, such as when the aircraft is on the ground.

The terms "aerial vehicle" and "aircraft" refer to a machine capable of flight, including, but not limited to, fixed wing aircraft, unmanned aerial vehicle, variable wing aircraft, and vertical take-off and landing (VTOL) aircraft. VTOL aircraft may include fixed-wing aircraft (e.g., Harrier jets), rotorcraft (e.g., helicopters), tilt-rotor/tilt-wing aircraft, and/or the new category of aircraft, as disclosed herein.

As used herein, the terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination.

The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para aramid synthetic fibers, etc.) and a matrix material (e.g., epoxies, polyimides, and alumina, including, without limitation, thermoplastic, polyester resin, polycarbonate thermoplastic, casting resin, polymer resin, acrylic, chemical resin). In certain aspects, the composite material may employ a metal, such as aluminum and titanium, to produce fiber metal laminate (FML) and glass laminate aluminum reinforced epoxy (GLARE). Further, composite materials may include hybrid composite materials, which are achieved via the addition of some complementary materials (e.g., two or more fiber materials) to the basic fiber/epoxy matrix.

Disclosed herein is an improved V/STOL 100 with double-blown wings 104. FIGS. 1 through 6c illustrate an example improved V/STOL 100 in accordance with an aspect of the invention. The improved V/STOL 100 is generally described as having a cockpit for manned operation, but may also be configured as unmanned (i.e., requiring no onboard pilot) or as both unmanned and fully autonomous (i.e., requiring neither an onboard pilot nor a remote control pilot). The improved V/STOL 100 may employ a moderate disc loading system where the lift and forward thrust (e.g., cruise) systems can each be optimized for its primary task, while also allowing use of both systems in vertical flight. Accordingly, the improved V/STOL 100 overcomes, inter alia, the negative interference effects of the tilt rotor while also avoiding the wing stall limits of the tilt wing.

The improved V/STOL's 100 airframe and body panels may be fabricated using materials that are lightweight, with a high specific strength, heat resistant, fatigue load resistant, crack resistant, and/or corrosion resistant. Suitable materials include, for example, composite materials and metals (e.g., aluminum, steel, titanium, and metal alloys). The size and purpose of the improved V/STOL 100 may determine the type of materials used. For instance, smaller to midsize aircraft may be more easily fabricated from composite materials, while larger aircraft may warrant metal. For example, the airframe may be a metal, while the body panels may be fabricated form composite material and/or metal. Metal fittings may be further used to couple or join the various components of the improved V/STOL 100, whether metal or composite material. The improved V/STOL 100 is illustrated as a cargo aircraft; however, the principles disclosed herein are equally applicable to other aircraft. As one of skill in the art would appreciate, the improved V/STOL 100 can be scaled up or down to facilitate a particular purpose or mission.

Figure 2:
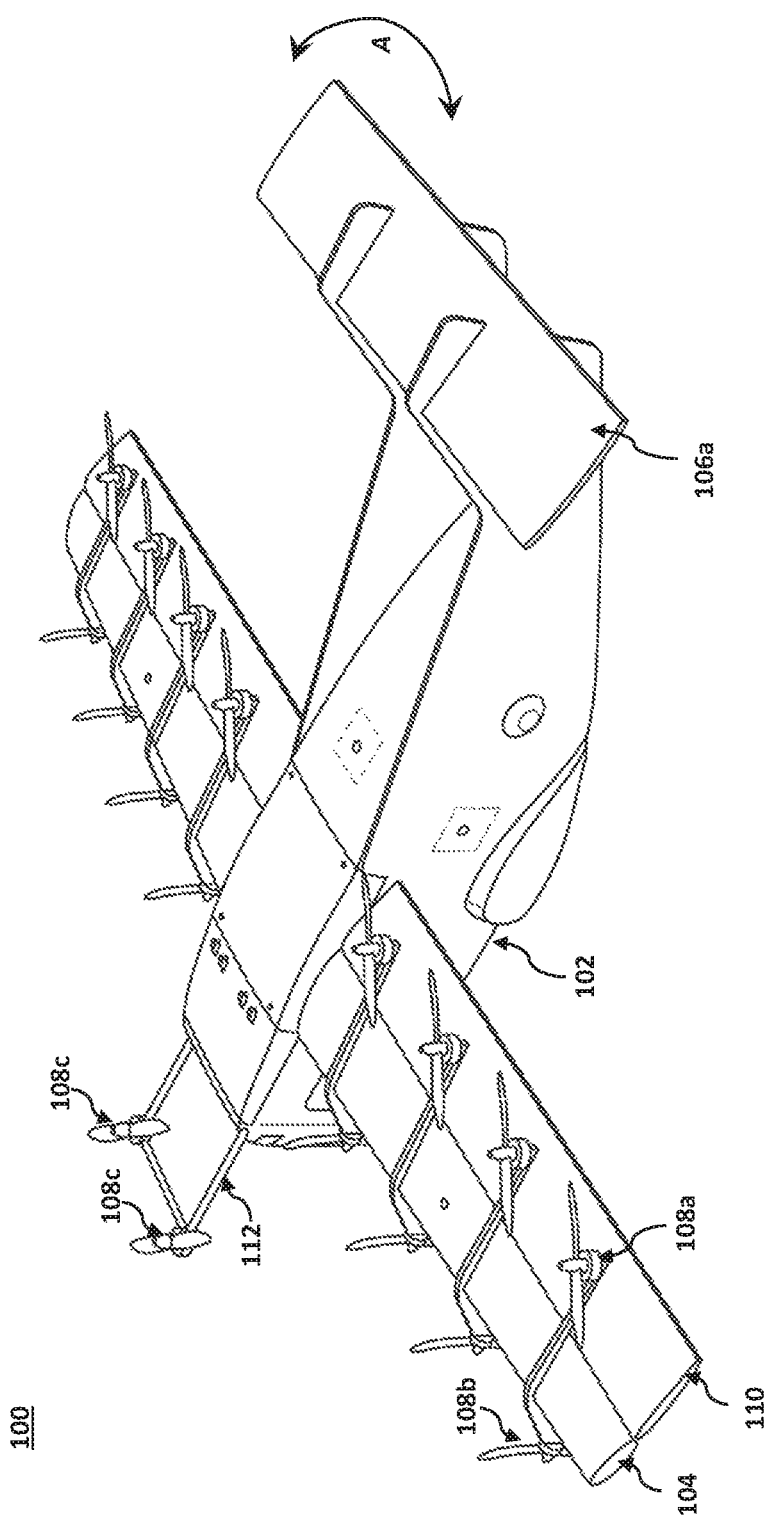
FIG. 2 illustrates a left rear isometric view of the example double-blown wing V/STOL.
Figure 3:
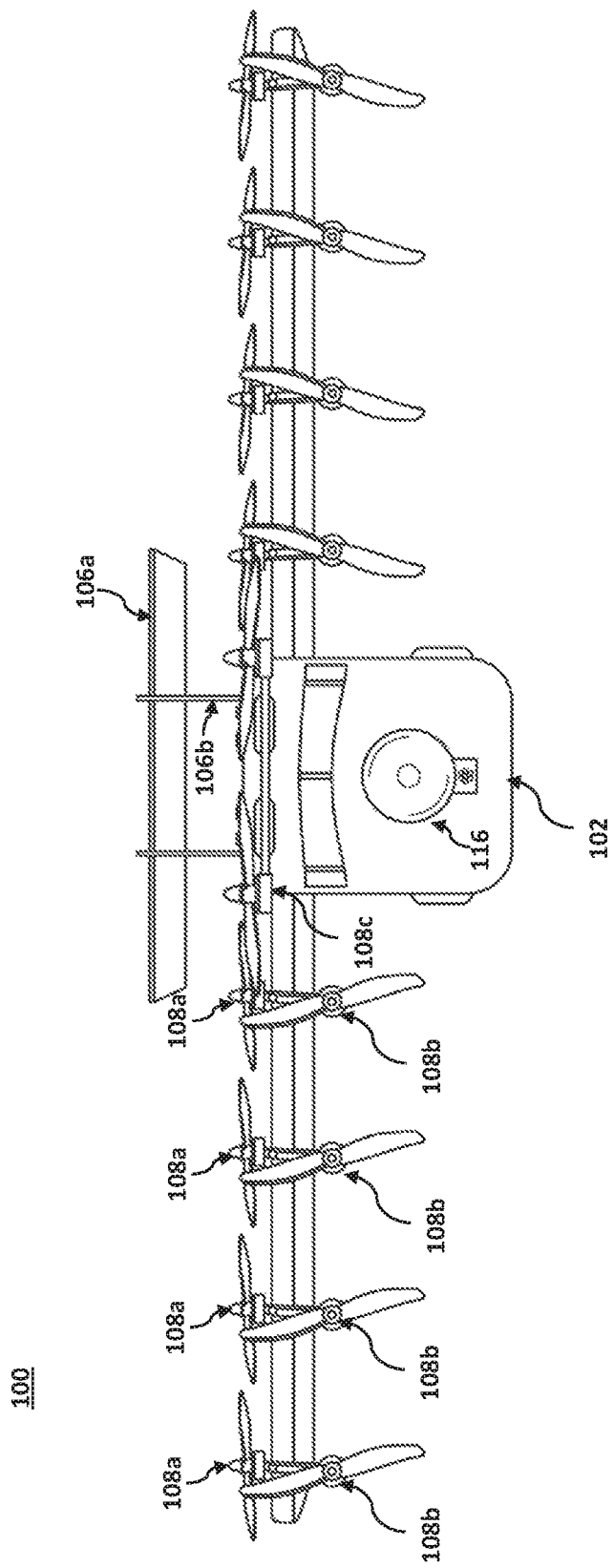
FIG. 3 illustrates a front view of the example double-blown wing V/STOL in a horizontal flight configuration.

As illustrated in FIGS. 1 through 3, the improved V/STOL 100 generally comprises a fuselage 102, two double-blown wings 104 (together defining a wing set), a plurality of rotors 108 (e.g., lift rotors 108a, thrust rotors 108b, pitch control rotors 108c), and an empennage 106. The size and location of the rotors 108 may be optimized for a particular need. To facilitate the loading and unloading of cargo, a rear loading ramp or clamshell rear doors may be employed at the aft end of the fuselage 102. The improved V/STOL 100 may further include landing gear 114 (e.g., nose-end landing gear and main landing gear) and payload 116.

An avionics bay may be provided to house the various navigation and flight control systems, which control the various aircraft components and functions. The navigation and flight control systems may be communicatively coupled with an Inertial Navigation System ("INS") that is communicatively coupled with an inertial measurement unit and GPS receiver, an onboard data storage device (e.g., hard drive, flash memory, or the like), a wireless communication device, or virtually any other desired services. The GPS gives an absolute drift-free position value that can be used to reset the INS solution or can be blended with it by use of a mathematical algorithm, such as a Kalman Filter. The avionics bay may also house, or be operably coupled to, the payload 116.

The payload 116, may be mounted to the nose of the fuselage 102 and include, for example, armament and/or an ISR surveillance payload used to collect data and/or monitor an area. For example, the improved V/STOL 100 may be equipped with one or more cameras, audio devices, and other sensors. Any video, or other data, collected by the improved V/STOL 100 may be communicated to a ground control station in real time wirelessly. The improved V/STOL 100 may be further equipped to store said video and data to the onboard data storage device.

The double-blown wings 104 of the improved V/STOL 100 are described as double-blown in that they comprises rotors positioned to direct thrust in two different directions. Specifically, the improved V/STOL 100 offers effective use of both lift rotors 108a and thrust rotors 108b. To that end, a plurality of rotors 108 are positioned on the double-blown wings 104 and fuselage 102 to generate the thrust necessary to facilitate vertical and horizontal flight. Although the rotors 108 are illustrated as comprises a plurality of rotor blades defining a propeller, other variations are possible. The rotors 108 are may employ other forms of rotor blades including, for example, turbine blades, fan blades, shrouded fan blades, etc.

The rotors 108 may be fixedly coupled to the double-blown wing 104 or fuselage 102 by one or more mounts. As illustrated, the thrust rotors 108b, for example, may be coupled to the double-blown wing 104 via underwing forward facing rotor mounts 118, while the lift rotors 108a may be coupled to the double-blown wing 104 via rear facing rotor mounts 120. As illustrated, the rotor blades of each thrust rotor may be positioned forward of the double-blown wing's 104 leading edge, while the axis of rotation of each thrust rotor 108b (e.g., the thrust blade's axis of rotation, $Axis_{Thrust}$) may be below of the double-blown wing 104. In certain aspects, the thrust rotors 108b may be positioned higher than as illustrated. The lift rotors 108a are positioned above the double-blown wing 104, while the axis of rotation of each lift rotor 108b (e.g., the lift thrust's axis of rotation, $Axis_{Lift}$) is aft of the double-blown wing 104. Although other arrangements are contemplated, including positioning the lift rotors 108a below and/or forward of the double-blown wing 104.

As illustrated, each of the lift rotors 108a comprises a first plurality of rotor blades defining a lift propeller having an axis of rotation ($Axis_{Lift}$) that is fixed in a substantially vertical position. Likewise, each of the thrust rotors 108b is illustrated with a second plurality of rotor blades defining a thrust propeller having an axis of rotation ($Axis_{Thrust}$) that is fixed in a substantially horizontal position. In other words, the lift rotors 108a generate a lift force vector that is substantially perpendicular to the thrust force vector of the thrust rotors 108b. While an embodiment is disclosed where the axes of rotation ($Axis_{Lift}$, $Axis_{Thrust}$) is fixed, in certain aspects, the lift rotors 108a and the thrust rotors 108b may be configured to adjust or pivot, thereby providing the ability to redirect force vectors as necessary. Pivotal rotors 108 would, however, result in increased cost and complexity. The rear facing rotor mounts 120 are configured to secure the lift rotors 108a over the double-blown wing's 104 trailing edge control surface (e.g., trailing edge flap 110), which pivots (i.e., deflects) downward when in a vertical flight configuration. Accordingly, as will be discussed below, the trailing edge flap 110 may be controlled by one or more actuators.

To facilitate a vertical flight configuration, pitch control rotors 108c may be mounted on the improved V/STOL 100 to provide pitch trim in vertical flight configuration as well as pitch control authority in both vertical and transition flight configuration. Pitch control rotors 108c, if needed or desired, can be used to balance the aircraft in pitch and/or provide pitch control for all flight regimes. The pitch control rotors 108c can be mounted anywhere on the improved V/STOL 100 that is convenient.

The pitch control rotors 108c, for example, may be positioned toward the forward end of the improved V/STOL 100 (e.g., near the nose of the improved V/STOL's 100 fuselage 102). The pitch control rotors 108c, for example, may be positioned toward the forward end of the improved V/STOL 100 when the hover lift centroid of the wing mounted lift rotors 108a, 108b is aft of the aircraft's desired center of gravity for fixed wing flight. In certain aspects, however, swept wings or larger, lifting tails may be provided to position the lift centroid of the wing and rotor assembly at or ahead of the center of gravity. Therefore, depending on the position of the lift centroid and the aircraft's center of gravity, the pitch control rotors 108c may extend beyond the nose of the fuselage 102, in which case, the pitch control rotors 108c may be supported by forward facing rotor mounts 112. The pitch control rotors 108c should have a moment arm to the center of gravity, but could be aft of the center of gravity.

The center of gravity may be determined using known techniques (e.g., using computer-aided design (CAD) software or using known mathematical equations). As can be appreciated by those of ordinary skill in the art, the term center of gravity generally refers to a point at which, if the aircraft were suspended, it would be balanced in all positions—i.e., aircraft's hypothetical balancing point in all directions.

The pitch control rotors 108c may be shut down (i.e., disabled) once the improved V/STOL 100 has achieved forward speed in the outbound transition (i.e., the transition from vertical/hover to horizontal flight) to sustain wing-borne flight. The pitch control rotors 108c may be shut down by discontinuing the power supply to the pitch control rotors 108c. The pitch control rotors 108c may be secured in an orientation that minimizes the drag of the rotor blades during forward flight (e.g., wing-borne flight). For example, the rotor blades may be positioned such that the longitudinal lengths of the rotor blades are parallel to the longitudinal length of the fuselage 102. In certain aspects, the pitch control rotors 108c could shut down below wing-borne speed because the horizontal stabilizer 106a has enough control authority below stall speed.

Although the improved V/STOL 100 is illustrated where each double-blown wing 104 is a primary wing, a canard wing or tandem wing configuration may be provided with a double-blown feature (e.g., having at least one lift rotor 108a and at least one thrust rotor 108b). For example, the double-blown feature may be applied to both wings (i.e., the primary wing and the canard wing/tandem wing). In another example, the double-blown feature may be applied to the canard wing, where only lift rotors 108a and flaps are positioned on the rear wing.

The rotors 108 may be driven by one or more techniques, including, without limitation, electric motors, wet fuel engines (e.g., a gasoline engine, a turboshaft, etc.), or a combination thereof.

In one example, each of the rotors 108 may be driven by an electric motor. The electric motors may receive power from one or more batteries or, in the alternative, an alternator driven by a wet fuel engine. For example, a wet fuel engine may be coupled with one or more generators to directly power the one or more electric motors and/or recharge the one or more batteries during flight. An example hybrid propulsion aircraft is disclose by commonly owned U.S. Patent Application No. 62/279,380, which was filed on Jan. 15, 2016 and is titled Hybrid Propulsion Vertical Take-Off and Landing Aircraft.

In another example, a combination of electric motors and wet fuel engines may be used. For example, the improved V/STOL 100 may include one or more wet fuel engines to drive the thrust rotors 108b (i.e., provide the forward thrust), while one or more electric motors may be used to drive the lift rotors 108a (e.g., provide the high peak power needed for vertical flight). The high peak power to the lift rotors 108a may be only needed for a short period relative to the thrust rotors 108b. The one or more electric motors may receive power from one or more batteries and/or an alternator driven by an engine. For example, the wet fuel engines may be coupled with one or more generators to directly power the one or more electric motors and/or recharge the batteries during flight. In yet another example, the improved V/STOL 100 may employ only wet fuel engines. That is, one or more wet fuel engines would drive both the lift rotors 108a and the thrust rotors 108b.

The speed or thrust of each rotor 108 may be independently controlled to provide a desired thrust pattern, thereby increasing efficiency and maneuverability. When electric motors are used, the speed of each rotor 108 may be independently controlled by adjusting the amount of power directed to the electric motor of a given rotor 108. In another example, wet fuel engines may be used, where the thrust of each rotor 108 is controlled by throttling the wet fuel engine. In addition, whether electric motors or wet fuel engines are used, the thrust from a given rotor 108 may be selectively controlled by adjusting the pitch of the rotor blades.

In certain aspects, the rotors 108 may employ counter-rotation ordering. For example, one rotor 108 may rotate clockwise, while the two adjacent rotors 108 rotate counterclockwise. Similarly, rotors 108 positioned on one side of the fuselage 102 may counter-rotate with regard to a corresponding rotor 108 (e.g., based on position ordering) positioned on the opposite side of the fuselage 102. Further, while not illustrated, the rotors 108 may be shrouded.

Figure 4A:
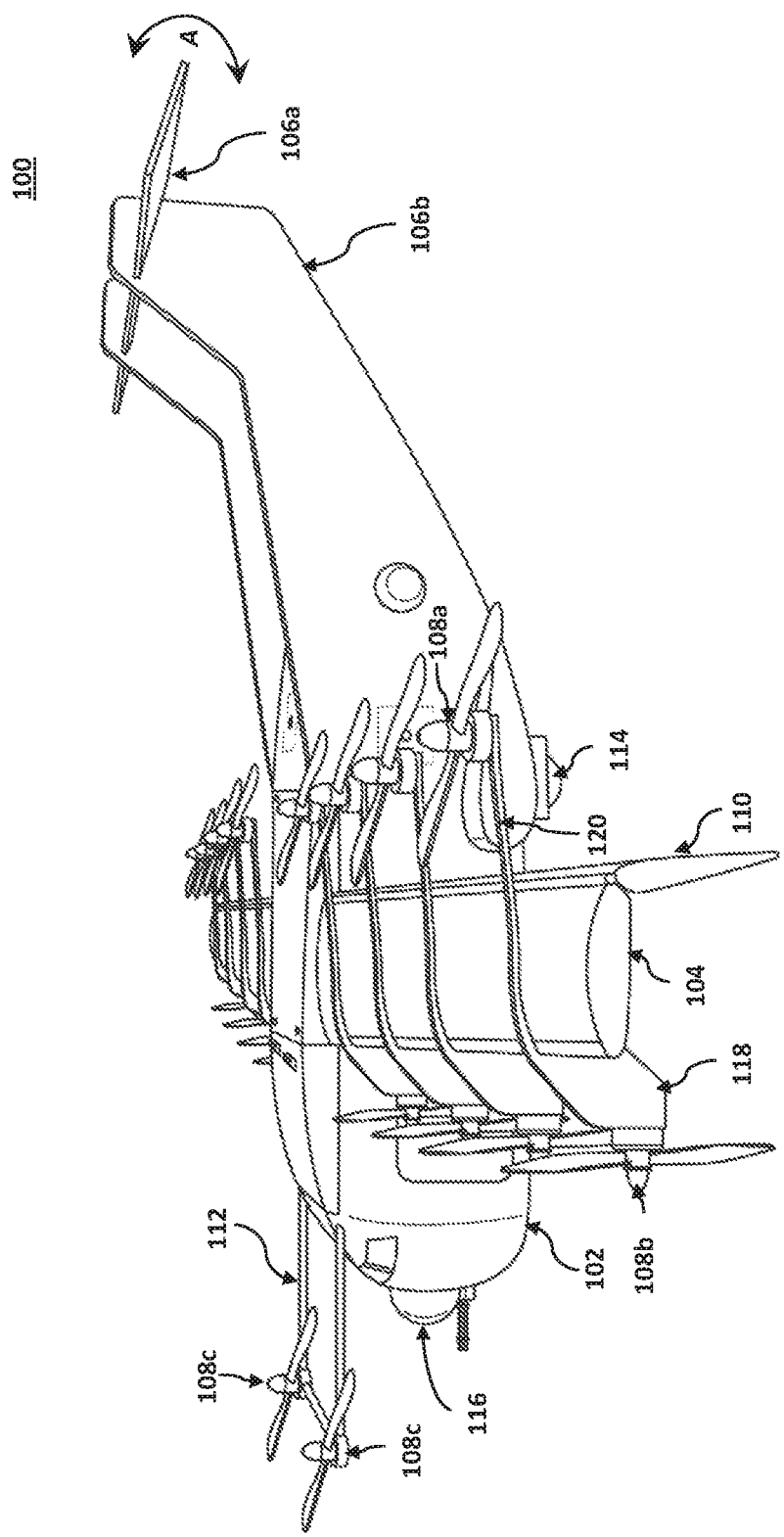
FIG. 4a illustrates a left side view of the example double-blown wing V/STOL in a vertical flight configuration.
Figure 4B:
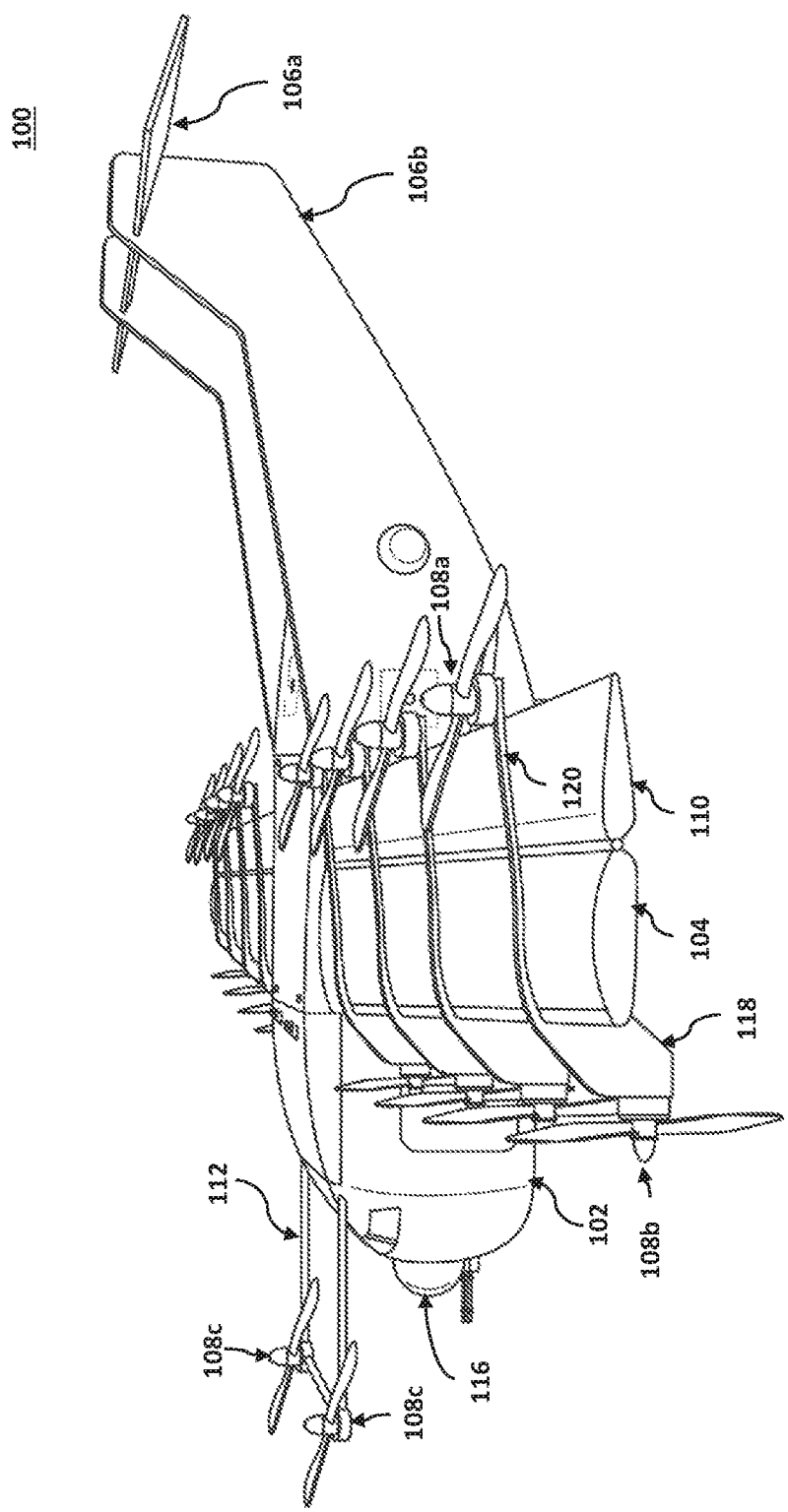
FIG. 4b illustrates a left side view of the example double-blown wing V/STOL in a horizontal flight configuration.
Figure 4C:
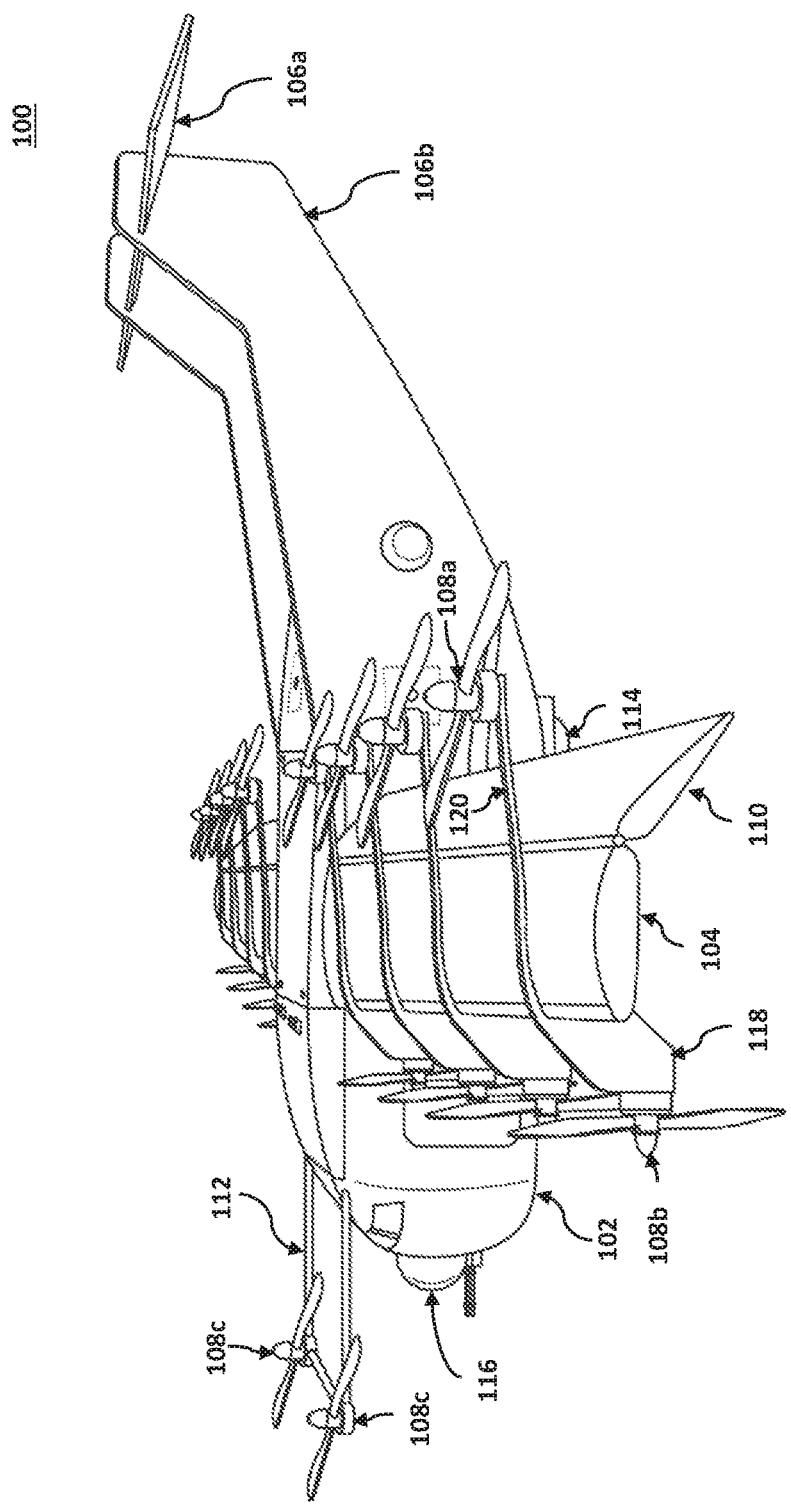
FIG. 4c illustrates a left side view of the example double-blown wing V/STOL in a transitional flight configuration.

The improved V/STOL 100 is configured to assume at least three general flight configurations, including a vertical flight configuration, a horizontal flight configuration, and a transitional flight configuration. FIGS. 4a through 4c illustrate, respectively, a left side view of the example double-blown wing V/STOL in a vertical flight configuration, a horizontal flight configuration, and a transitional flight configuration. As illustrated, each double-blown wing 104 may be arranged with a plurality of lift rotors 108a to provide a vertical thrust, and a plurality of thrust rotors 108b to provide a horizontal thrust (e.g., forward thrust).

The thrust rotors 108b may supplement the vertical thrust from the lift rotors 108a when in vertical flight by selectively controlling the trailing edge flap 110 to redirect the horizontal thrust. In certain aspects, however, the trailing edge flap 110 may be omitted, whereby a fan wake interaction between the two rotors (i.e., lift rotors 108a and thrust rotors 108b) and an unflapped wing can still yield a viable V/STOL. Additional pitch control rotors 108c may be provided at the forward end of the fuselage 102 to provide balance to the aircraft during vertical takeoff. While the pitch control rotors 108c are illustrated and described as being forward of the double-blown wing 104, the pitch control rotors 108c may be positioned elsewhere (e.g., at the rear).

Unlike other VTOL's that rotate the cruise rotors for hover (including tilt rotors and tilt wings), the disclosed system can be fully optimized for cruise, with higher pitch, smaller diameters etc. As noted above, variable pitch rotor blades, including reverse pitch, may also be employed to provide increased yaw control. Thus, the pitch of the rotor blades may be adjusted to control the amount of thrust generated by a given rotor 108. To mitigate cost, variable pitch thrust rotors 108b need not be used with moderate performance aircraft, however. Mechanically, the improved V/STOL 100 can be more simply designed and manufactured than is possible with other VTOL aircraft; the only variable geometry feature required being the trailing edge flap 110.

The V/STOL 100 also offers increased safety. In the event of a mechanical failure of the trailing edge flap 110, for example, the operator need only match any remaining (i.e., operational) trailing edge flap 110 positions to that of the failed trailing edge flap 110, whereby the improved V/STOL 100 can simply land at the appropriate speed. For example, knowing a given amount of flap deflection, rotor power levels, and airspeed; the amount of lift available may be determined to calculate how much slower the improved V/STOL 100 may travel without stalling.

In order to more closely position the rotors 108 on the double-blown wing 104, thereby increasing the number of rotors 108 on a given wingspan, the sweep of the rotor's 108 rotor blades may overlap. Except in embodiments where variable speed or counter rotating motors (or engines) are employed, this may be accomplished by meshing the rotor blades such that adjacent rotor blades are out of phase by, for example, 90 degrees relative to one another (when 2 bladed propellers are used). Such meshing schemes would work with variable pitch rotor blades. Alternatively, the rotors 108 may be tilted or offset. For instance, the lift rotors 108a may be tilted by a predetermined angle (inward or outward). Such tilting schemes may not work with variable pitch rotor blades, depending on the degree of tilt. For example, the rotor's axis of rotation may be tilted about 6 degrees (inward or outward). Calculations have shown that the loss of lift due to the 6-degree tilt is only about 0.5%. An inward tilt (i.e., blowing down and outward from the fuselage 102) serves an added benefit of blowing dust away from the improved V/STOL 100 and minimizing foreign object ingestion. Tilting the thrust rotors 108b outward may be less convenient; however, the thrust rotors 108b can be staggered by providing a minimal wing leading edge sweep. In another aspect, the lift rotors 108a may be positioned at different heights relative to the upper wing surface such that the rotor blades can overlap with one another without requiring that the rotor blades tilt.

A small wing leading edge sweep is also helpful in reducing drag at, where applicable, reasonably high subsonic speeds. Moreover, a small wing leading edge sweep also makes the span wise lift distribution closer to the optimum elliptical shape. As illustrated, the double-blown wing 104 may employ moderate to high aspect ratio and little to moderate sweep back.

The only necessary moving flight surfaces on the illustrated improved V/STOL 100 are the trailing edge flaps 110 positioned on the double-blown wings 104 and the empennage 106, thereby reducing weight and cost by obviating the need for additional moving parts.

Figure 5:
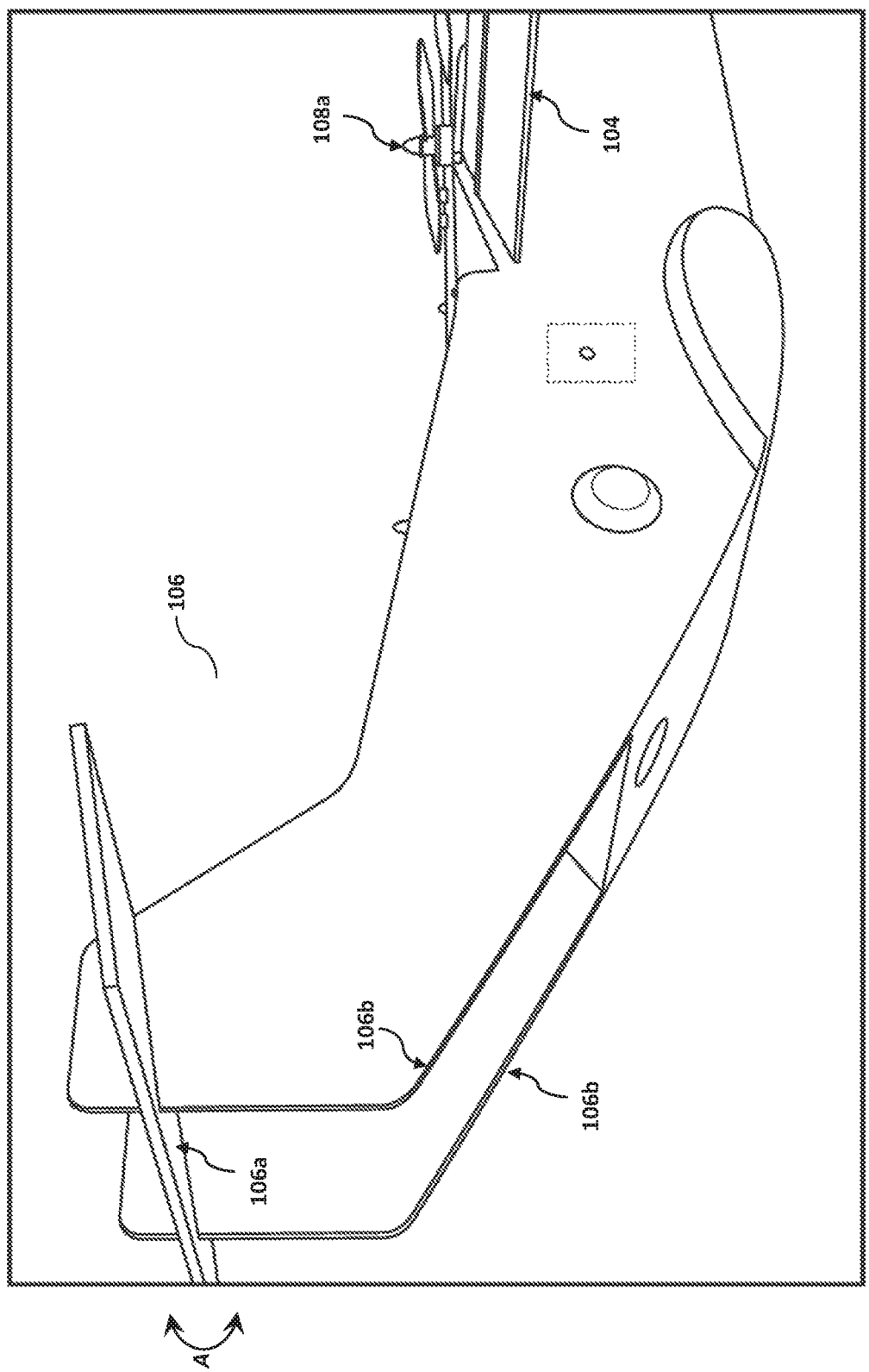
FIG. 5 illustrates a right rear prospective view of the example double-blown wing V/STOL.

With reference to FIG. 5, the empennage 106 generally comprises two parts, the horizontal stabilizer 106a, and a set of parallel vertical stabilizers 106b (or a single vertical stabilizer 106b). Since the illustrated fuselage 102 is wide and generally boxy in shape, twin vertical stabilizers 106b may be used to provide additional advantages for VTOL aircraft. The horizontal stabilizer 106a may be used to prevent the improved V/STOL 100 from pitching up or down. The rear portion of the horizontal stabilizer 106a may employ an elevator, which may be hinged to the horizontal stabilizer 106a. An elevator is a movable airfoil that may be used to control the up-and-down motion of an aircraft's nose during wing-borne flight.

In other aspects, as is illustrated, the entire horizontal stabilizer 106a may be pivotally coupled to the set of vertical stabilizers 106b, thereby pitching up or down relative to the vertical stabilizer(s) 106b to function as an elevator (i.e., as a single unit). To minimize downwash interactions, the empennage 106's horizontal stabilizer 106a is high (e.g., a "T" or "Pi"/"π" tail, although other configurations are contemplated), thereby keeping it in a location where there is minimal downwash effect from the double-blown wing 104 and the lift and/or thrust rotors 108a, 108b. A lower empennage 106 will still work, but larger trim deflections through transition should be expected, and a full flying tail may be needed.

The horizontal stabilizer 106a may be configured to pivot relative to the vertical stabilizers 106b, as indicated by arrow A. For example, the horizontal stabilizer 106a tilts downward to improve stability in vertical flight configuration (hover mode). More specifically, the horizontal stabilizer 106a may be tilted to align with any downwash is in the flow; otherwise, the nose of the improved V/STOL 100 could pitch upwardly. An empennage 106, as illustrated, is sufficiently high (relative to scale) such that the downwash is not too strong and can be aligned with the flow. The angle may be further adjusted until a zero downwash effect point is achieved. For purely short takeoff and landing variants of the aircraft, a traditional horizontal tail may be adequate to control authority without requiring trim rotors.

Figure 6A:
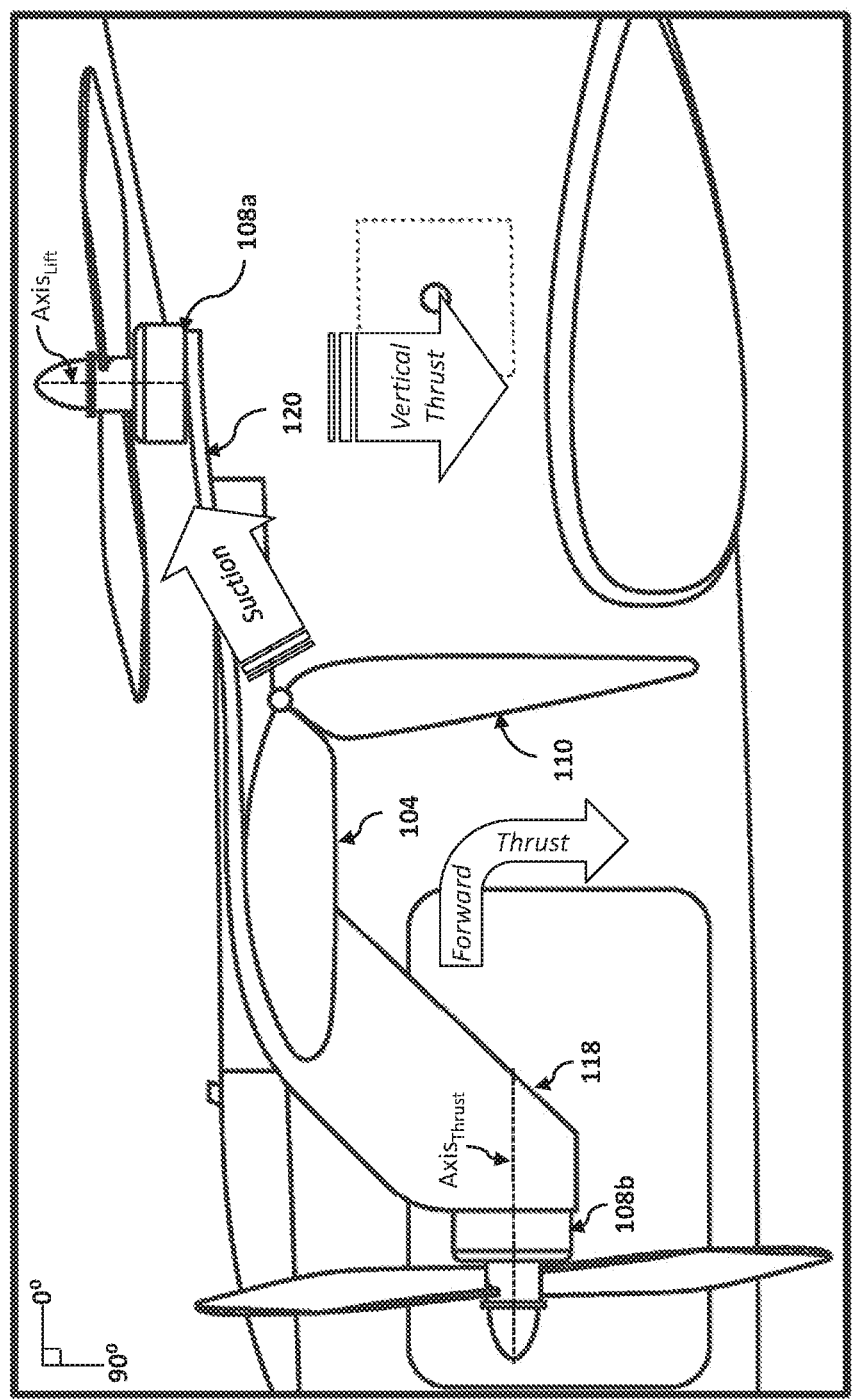
FIG. 6a illustrates an enlarged side view of the wing and the trailing edge flap in a vertical flight configuration.
Figure 6B:
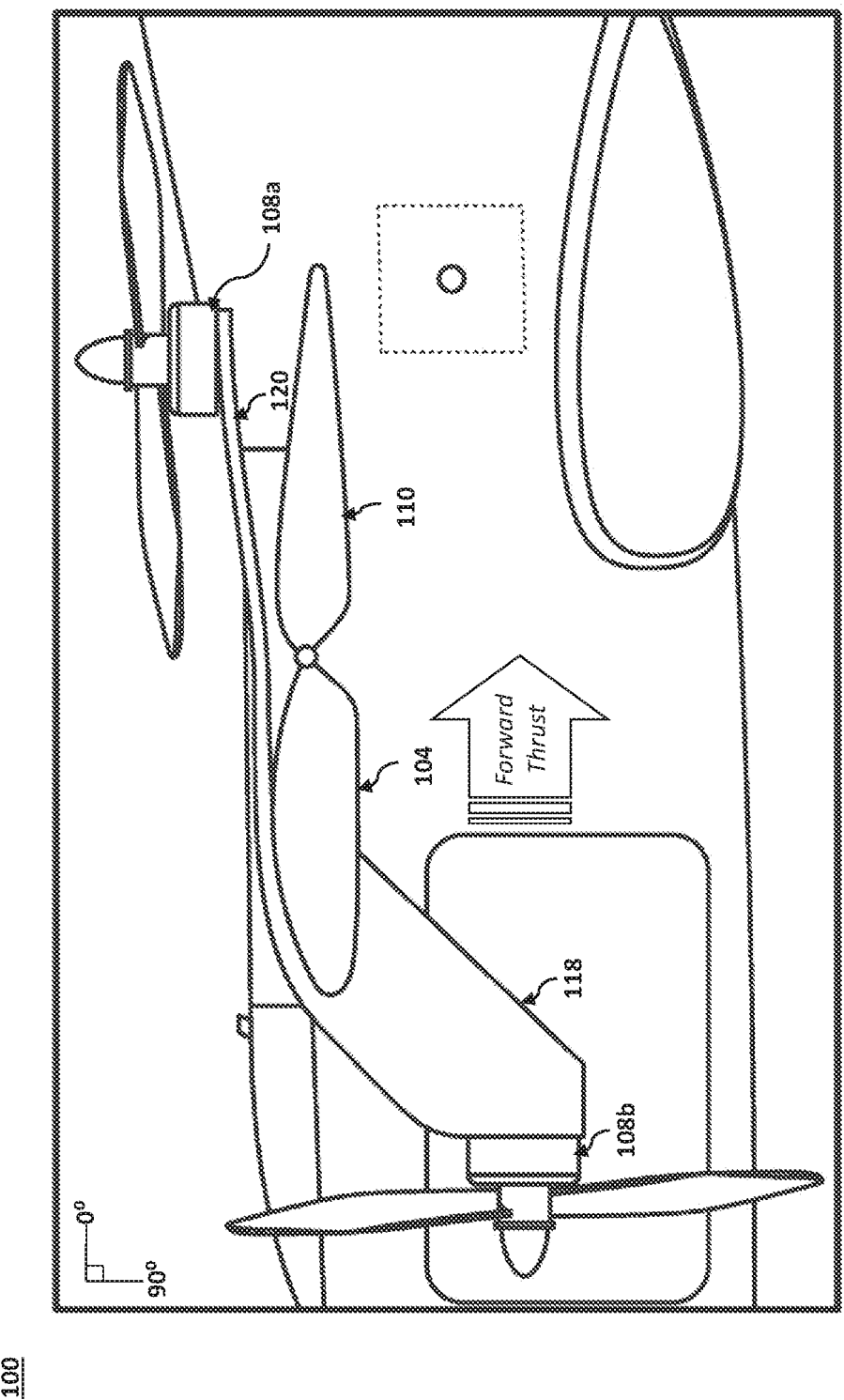
FIG. 6b illustrates an enlarged side view of the wing and the trailing edge flap in a horizontal flight configuration.
Figure 6C:
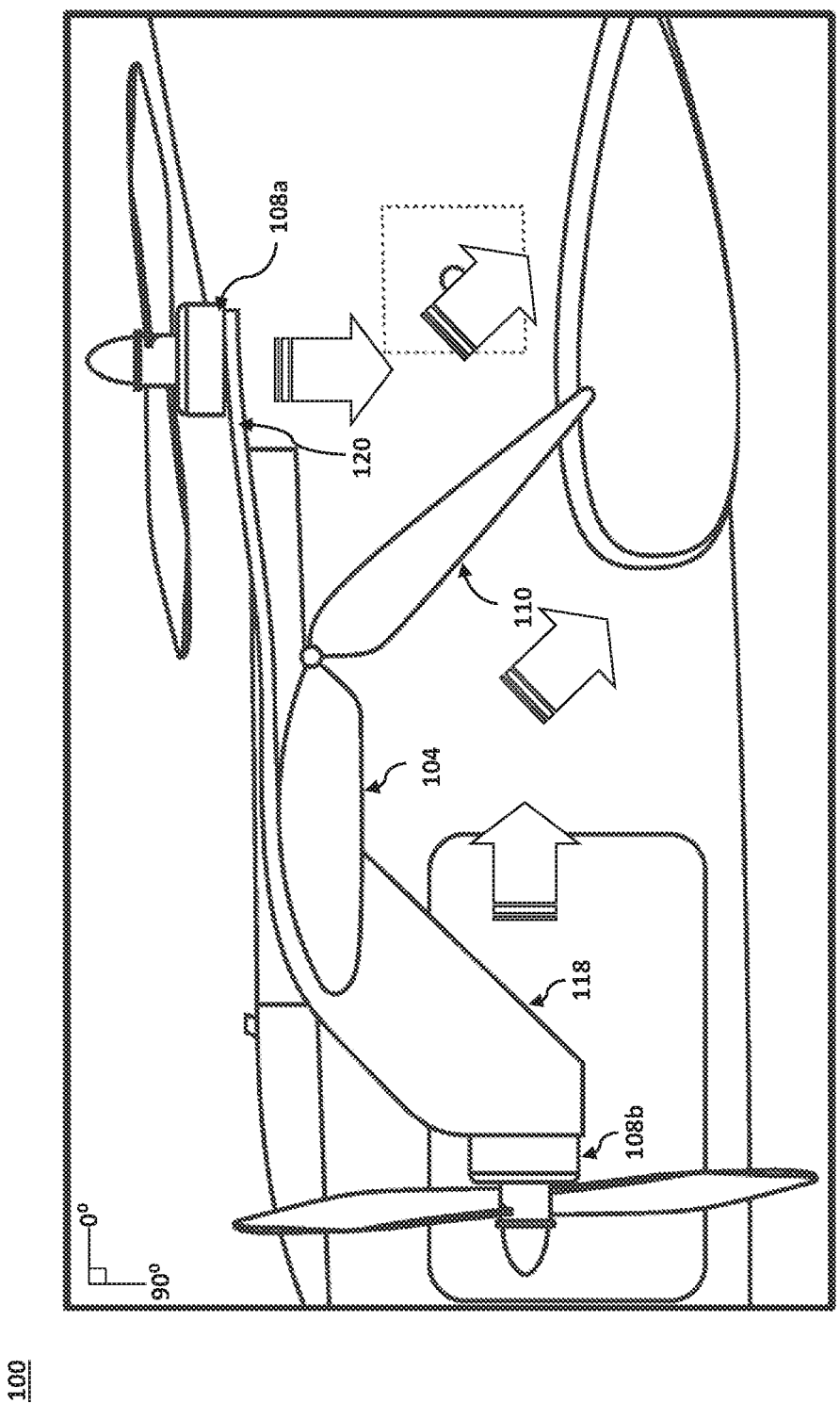
FIG. 6c illustrates an enlarged side view of the wing and the trailing edge flap in a transitional flight configuration.

FIGS. 6a through 6c illustrate, respectively, enlarged side views of the double-blown wing 104 and the trailing edge flap 110 in a vertical flight configuration, a horizontal flight configuration, and a transitional flight configuration. As illustrated, the trailing edge flap 110 of the double-blown wing 104 deflects downwardly from about 0 degrees (i.e., horizontal flight configuration) to about 90 degrees (i.e., vertical flight configuration), wherein the intermediate positions between 0 and 90 degree are transitional flight configurations.

Testing demonstrates that a trailing edge flap 110 angle of about 90 degrees or less, however, offers increased efficiency in the vertical flight configuration. Accordingly, in the vertical flight configuration, the trailing edge flap 110 may be held at an angle that is less than or about 90 degrees (e.g., a deflection between 75 degrees and 90 degrees, more preferably between about 80 degrees and 85 degrees). As can be appreciated by those of skill in the art, the specific deflection can depend on the shape details of the trailing edge flap 110.

FIG. 6a illustrates the trailing edge flap 110 in a vertical flight configuration (deflected downward about 90 degrees off a horizontal plane), while FIGS. 6b and 6c illustrate, respectively, the trailing edge flap 110 in a horizontal flight configuration and an example transitional flight configuration of about 45-60 degrees.

Since the illustrated thrust rotors 108b are positioned ahead and somewhat below the double-blown wing 104, most of the propwash is directed below the double-blown wing 104, but some propwash can go above the double-blown wing 104. The rotor-induced flow around the double-blown wing 104 minimizes drag on the flap. The lift rotors 108a are driven only in vertical flight configurations and transition flight configuration, and are not driven during horizontal flight configuration when wing-borne flight is possible. Preferably, the rotor blades of the lift rotors 108a are stopped and/or secured in an orientation that minimizes the drag of the blades during wing-borne flight. For example, the blades may be positioned such that the longitudinal lengths of the blades are parallel to the longitudinal length of the fuselage 102.

In vertical flight operation, the lift rotors 108a and the thrust rotors 108b each generate a force, of which the force from the thrust rotors 108b is diverted by the trailing edge flap 110 and effectively converted from a forward thrust force to a lift force. As illustrated in FIG. 6a, a wing suction force is generated during vertical flight operation on the upper side of the double-blown wing 104. The trailing edge flap 110 may be hinged and shaped as illustrated to yield a relatively smooth surface on the upper surface of the trailing edge flap 110, thereby omitting convex kinks that cause flow separation. As illustrated in FIG. 6b, the lift rotors 108a may be disabled during wing-borne flight, while thrust rotors 108b generated forward thrust to sustain wing-borne flight. As illustrated in FIG. 6c, the lift rotors 108a and the thrust rotors 108b each generate a force, which is effectively combined by the trailing edge flap 110 during transition and redirected downward and aft.

When the trailing edge flap 110 is deflected downward and the lift rotors 108a are driven (spinning), the propwash from the thrust rotors 108b (the portion directed below the double-blown wing 104) is effectively deflected downwards by the trailing edge flap 110 and the interaction with the propwash of the lift rotors 108a, thereby adding to the vertical thrust in hover mode. Moreover, in hover mode, the double-blown wings 104 do not stall due to the airflow over the trailing edge flap 110. The combination of the propwash of both the lift rotors 108a and thrust rotors 108b blows air over the double-blown wing 104 such that the resulting pressure forces on the double-blown wing 104 add to the vertical thrust in vertical flight. The suction forces on the aft face of the deflected trailing edge flap 110 also counter some of the residual forward thrust of the thrust rotors 108b, allowing a hover with the body nearly level.

The trailing edge flaps 110 may be coupled with the double-blown wing 104 in accordance with one or more flap configurations, including, for example, plain flaps, slotted flaps, and fowler flaps.

FIGS. 7a and 7b illustrate cross sections of an example wing airfoil 700 having a smooth upper surface 702 with the deflected trailing edge flap 110, while still having relatively low drag in wing-borne flight. The trailing edge flap 110 of wing airfoil 700 has a very smooth surface in hover mode (FIG. 7a). The trailing edge flap 110 of wing airfoil 700 has a simple hinge and the curved leading edge 704 retracts into the double-blown wing 104 for wing-borne flight (FIG. 7b). The upper surface shape of the trailing edge flap 110 is designed to promote smooth reattachment of the airflow after going over the recessed area.

While plain flaps enable the flap to increase wing camber and deflect/pivot downwardly, slotted flaps not only increase wing camber, but, when extended, also provide a slot between the double-blown wing 104 and the trailing edge flap 110. In flight, high pressure air from the underside of the double-blown wing 104 can flow through the slot into the upper surface of the double-blown wing 104, which adds energy to the double-blown wing's 104 boundary layer, delays airflow separation, and produces less drag.

Figure 8:
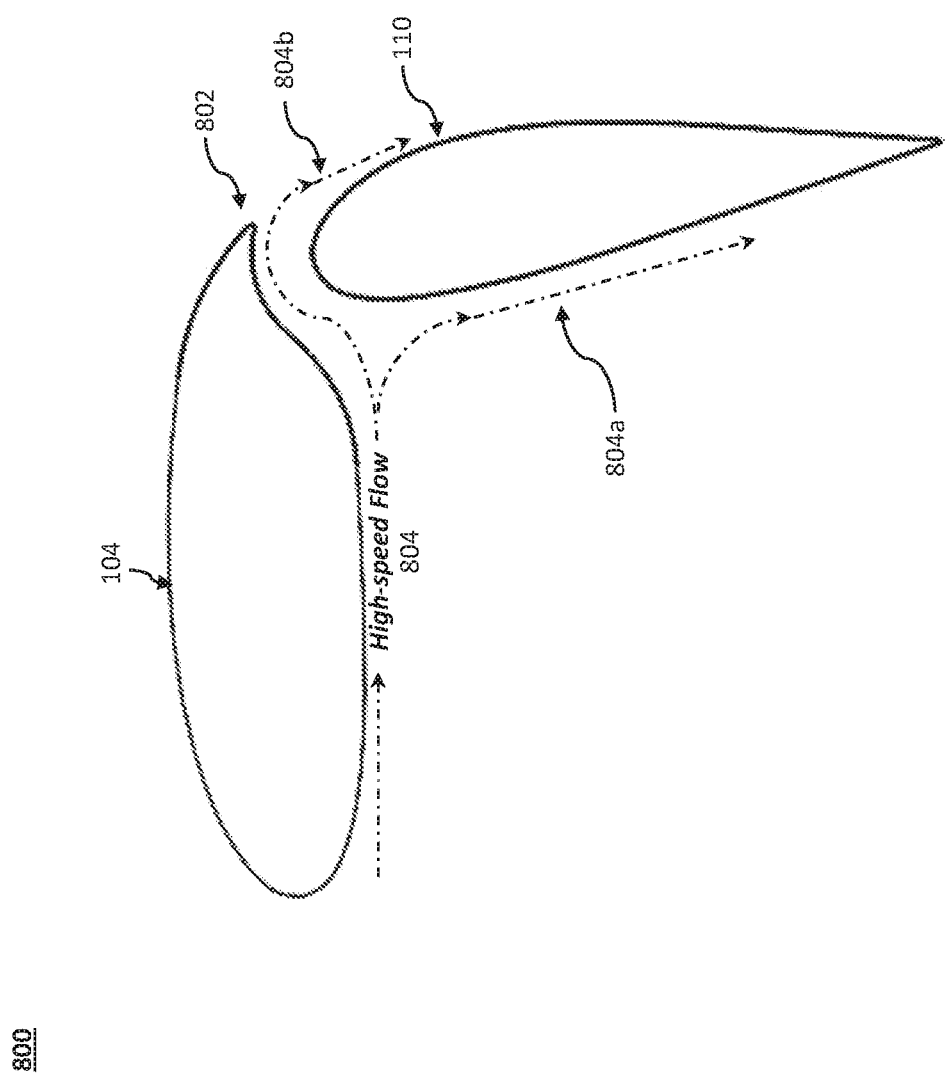
FIG. 8 illustrates an example wing airfoil with a slotted flap.

FIG. 8 illustrates cross sections of an example wing airfoil 800 having a slotted flap, which offers improved performance in some situations. A first portion 804a of the high-speed flow 804 (e.g., forward thrust) from the thrust rotors 108b is deflected downward via the trailing edge flap 110. A second portion 804b of the high-speed flow 804 travels through the slot 802 and curves onto the aft surface of the trailing edge flap 110, which is then deflected downward by the combination of the slot 802 shape and the flow from the lift rotors 108a. This configuration could turn the high-speed flow 804 from the thrust rotors 108b more efficiently than a simple flap, but at the expense of a more complicated hinge and possibly more drag in wing-borne flight.

Fowler flaps further increase the area of the double-blown wing 104 by extending out on rails or tracks, while a variant known as slotted-fowler flaps further include a series of slots to increase energy to the airflow, akin to the above described slotted flaps. The standard methods used in industry for designing slotted flaps and their hinge mechanisms can be used.

While a single large trailing edge flap 110 is illustrated on each double-blown wing 104, other types of trailing edge flaps 110 are contemplated. For example, multiple trailing edge flaps (e.g., smaller adjacent trailing edge flaps) may be positioned along the span of each wing. A design parameter, however, is to provide a flow path to the propwash from the lift rotors 108a and any other entrained flow. As used herein, the term propwash refers to the spiral-shaped slipstream formed behind the rotating rotor blade of the rotors 108. The lift rotors 108a are located toward the aft end of the double-blown wing 104 such that most of the propwash goes behind the double-blown wing 104, but the front edge of the propwash could be on the trailing edge of the double-blown wing 104 and any flight surfaces that might be there.

As one of skill in the art would appreciate, the precise location of the lift rotors 108a may be positioned and optimized on a case-by-case basis, as needed for a given aircraft. If a large number of small rotors are used, such redundancy provides increased safety in the event of rotor failure. While the prototype employed sixteen rotors 108 mounted on each double-blown wing 104, eight lift rotors 108a and eight thrust rotors 108b; the number of rotors 108 may be optimized for a given aircraft, but the expectation is that the number of rotors will be at least four lift rotors 108a and four thrust rotors 108b. One lift rotor 108a and one thrust rotor 108b may be positioned on, and share, a common structural component. That is, a common structural component, such as a single shared mounting rib or beam, defines, or otherwise provides, the underwing forward facing rotor mount 118 and the rear facing rotor mount 120, thus yielding mass balancing to the double-blown wing 104 and reducing flutter issues. The configuration also works effectively for STOL aircraft, with an appropriate trailing edge flap 110 setting and power allocation. The configuration also provides an advantageous steep descent capability, unlike tilt wing and tilt rotor aircraft. If the lift rotors 108a are shut down or at very low power, the large trailing edge flap 110 has very high drag and still has a high aerodynamic lift, thus allowing for a very steep descent at moderate airspeed. At the appropriate time, the lift and cruise rotors are throttled up, and the plane is flared into hover mode.

To evaluate the various design parameters, a scale prototype of the improved V/STOL aircraft was fabricated and tested. The scale version employed a cargo style fuselage having a cargo length of 14 inches (not accounting for the empennage 106), a width of 5 inches, and a height of 5 inches. The wingspan was 45 inches (an area of 285 square inches, or 1.98 sq. ft.). The wing chord was 6.25 inches, with an aspect ratio of 7.1:1. The total weight was 70.1 ounces (4.38 pounds), including the 4.2 ounces of paint.

The scale model employed 18 rotors 108, including 8 thrust rotors 108b (each on the double-blown wings 104) and 8 lift rotors 108a on the double-blown wings 104. The scale prototype used two pitch control rotors 108c, identical to the eight wing mounted lift rotors 108a, located in front of the nose of the fuselage. The vertical thrust disk area was 191 square inches (1.33 sq. ft.), while the horizontal thrust disk area was 151 square inches (1.05 sq. ft.); for a total thrust disk area of 342 square inches (2.375 sq. ft). The weight divided by total disc area gave a disk loading of 0.205 ounces per square inch (1.84 pounds per square foot). The wing loading was 0.246 ounces per square inch (2.212 pounds per square foot). The total disc area to wing area ratio was 1.2 to 1.

Test data indicates that the thrust rotors 108b, at moderate power, are about as effective as the dedicated lift rotors 108a (in terms of vertical force per Watt of power input). If the lift rotors 108a are shut down, the thrust rotors 108b are dramatically less effective. This is a fundamental difference from previous deflected slipstream VTOL aircraft. Thus, the configuration makes good use of the mass of the cruise propulsion system to add to the hover thrust, an advantage over other VTOL aerial vehicles with separate lift and cruise propulsion systems. This can be true even when the cruise system is optimized for cruise flight.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the invention may therefore be practiced otherwise than as specifically described above.

What is claimed is:

1. An apparatus comprising:
a wing having a leading edge and a trailing edge;
a mounting rib having a first end and a second end, the mounting rib coupled to the wing, the first end forward and below the leading edge, the second end aft and above the trailing edge, the mounting rib including:
a first rotor having a first propeller, the first rotor coupled to the first end of the mounting rib, the first propeller having a first axis of rotation; and
a second rotor having a second propeller, the second rotor coupled to the second end of the mounting rib, the second propeller having a second axis of rotation substantially perpendicular to the first axis of rotation.

2. The apparatus of claim 1, wherein the first rotor is driven by a wet fuel engine and the second rotor is driven by an electric motor.

3. The apparatus of claim 1, wherein the first rotor and the second rotor are independently controlled.

4. The apparatus of claim 1, wherein the first rotor and the second rotor are positioned at the same lateral position along the wing.

5. The apparatus of claim 1, wherein the mounting rib is a first mounting rib mounted to a first side of the wing, and further including:
a second mounting rib having a third end and a fourth end, the second mounting rib coupled to the first side of the wing, the third end forward of the leading edge, the fourth end aft of the trailing edge, the second mounting rib including:
a third rotor having a third propeller, the third rotor coupled to the third end of the second mounting rib below the leading edge, the third propeller having a third axis of rotation; and
a fourth rotor having a fourth propeller, the fourth rotor coupled to the fourth end of the second mounting rib above the trailing edge, the fourth propeller having a fourth axis of rotation substantially perpendicular to the third axis of rotation.

6. The apparatus of claim 5, wherein the second propeller is at a first height above the trailing edge and the fourth propeller is at a second height above the trailing edge, the first height different from the second height.

7. The apparatus of claim 6, wherein the second propeller is configured to rotate in a first direction and the fourth propeller is configured to rotate in a second direction, the second direction opposite the first direction.

8. The apparatus of claim 5, wherein the second rotor and the fourth rotor are configured to rotate out of phase with each other.

9. The apparatus of claim 5, wherein the second propeller has a first sweep and the fourth propeller has a second sweep, a first portion of the first sweep to overlap a second portion of the second sweep.

10. An aircraft wing comprising:
a leading edge and a trailing edge;
a control surface pivotably coupled to the trailing edge; and
a plurality of mounting ribs having respective first ends and second ends, the first ends forward and below the leading edge, the second ends behind and above the trailing edge, the plurality of mounting ribs including a first mounting rib, the first mounting rib including:
a first rotor having a first propeller, the first rotor coupled to the first end of the first mounting rib, the first propeller having a first axis of rotation; and
a second rotor having a second propeller, the second rotor coupled to the second end of the first mounting rib, the second propeller having a second axis of rotation substantially perpendicular to the first axis of rotation.

11. The aircraft wing of claim 10, wherein the control surface is configured to move from a vertical flight configuration to either a transitional flight configuration or a horizontal flight configuration.

12. The aircraft wing of claim 11, wherein the first rotor is disabled and the second rotor is enabled during the vertical flight configuration.

13. The aircraft wing of claim 11, wherein the second rotor includes a blade having a first longitudinal length, the first rotor is enabled and the second rotor is disabled during the horizontal flight configuration, and the blade is secured in the horizontal flight configuration such that the first longitudinal length is substantially parallel to a second longitudinal length of the aircraft wing.

14. The aircraft wing of claim 11, wherein the control surface is configured to deflect downwardly from a horizontal position in the horizontal flight configuration that substantially blocks a path for a vertical thrust force of the second rotor to a substantially vertical position in the vertical flight configuration that substantially clears the path for the vertical thrust force.

15. The aircraft wing of claim 10, wherein the control surface defines a slot between the trailing edge and the control surface, a first portion of a high-speed flow from the first rotor is to be deflected downward via the control surface and a second portion of the high-speed flow is to be directed through the slot onto an aft surface of the control surface.

16. An aircraft comprising:
   a fuselage having a front side, a rear side, a first lateral side, and a second lateral side opposite the first lateral side;
   a first wing having a first trailing edge and a first leading edge coupled to the first lateral side, the first wing having first mounting ribs having first ends and second ends, the first ends forward and below the first leading edge, the second ends aft and above the first trailing edge;
   a second wing having a second trailing edge and a second leading edge coupled to the second lateral side, the second wing having second mounting ribs having third ends and fourth ends, the third ends forward and below the second leading edge, the fourth ends aft and above the second trailing edge, the second mounting ribs including a third mounting rib including:
      a first rotor having a first propeller, the first rotor coupled to the third end of the third mounting rib; and
      a second rotor having a second propeller, the second rotor coupled to the fourth end of the third mounting rib, and
   a third rotor having a third propeller, the third rotor coupled to the front side of the fuselage.

17. The aircraft of claim 16, wherein the first propeller has a first axis of rotation, the second propeller has a second axis of rotation substantially perpendicular to the first axis of rotation, and the third propeller having a third axis of rotation perpendicular to the first axis of rotation.

18. The aircraft of claim 16, wherein the aircraft is operable in a vertical flight configuration a transitional flight configuration, or a horizontal flight configuration.

19. The aircraft of claim 18, wherein the first rotor is disabled, the second rotor is enabled, and the third rotor is disabled during the vertical flight configuration.

20. The aircraft of claim 16, wherein the first rotor is configured to generate a horizontal thrust force, the second rotor is configured to generate a vertical thrust force, and the third rotor is configured to generate pitching moment control force of the aircraft.

21. A method to control a vertical or short takeoff and landing (V/STOL) aircraft, the method comprising:
   moving a control surface of a wing of the V/STOL aircraft from a first position to a second position, the wing including a mounting rib having a first end and a second end, the first end forward and below a leading edge of the wing, the second end aft and below a trailing edge of the wing, the mounting rib including a first rotor coupled to the first end of the mounting rib and a second rotor coupled to the second end of the mounting rib, the first rotor having a first axis of rotation substantially perpendicular to a second axis of rotation of the second rotor, the second position to facilitate a vertical flight configuration of the V/STOL aircraft;
   disabling the first rotor; and
   enabling the second rotor to generate a lift force vector.

22. The method of claim 21, further including pivoting the second rotor from a third position to a fourth position, the fourth position to facilitate the vertical flight configuration, the second rotor enabled in response to the second rotor pivoting to the fourth position.

23. The method of claim 21, further including:
   pivoting the first rotor from a third position to a fourth position; and
   enabling the first rotor to generate a thrust force vector in response to the first rotor moving the fourth position, the control surface to redirect the thrust force vector to facilitate the vertical flight configuration.

24. The method of claim 21, further including:
   pivoting a third rotor from a third position to a fourth position, the third rotor coupled to a nose of a fuselage of the V/STOL aircraft; and
   in response to the pivoting to the fourth position, enabling the third rotor to control pitch trim of the V/STOL aircraft to facilitate the vertical flight configuration.

25. The method of claim 21, further including:
   moving the control surface from the second position to a third position, the third position to facilitate a horizontal flight configuration;
   pivoting the second rotor from a fourth position to a fifth position, the fifth position to facilitate the horizontal flight configuration;
   disabling the first rotor to cease generating the lift force vector;
   pivoting the first rotor from a sixth position to a seventh position, the seventh position to facilitate the horizontal flight configuration; and
   enabling the first rotor to generate a thrust force vector.

\* \* \* \* \*